(12) United States Patent
Nieto et al.

(10) Patent No.: US 9,118,401 B1
(45) Date of Patent: Aug. 25, 2015

(54) METHOD OF ADAPTIVE INTERFERENCE MITIGATION IN WIDE BAND SPECTRUM

(71) Applicant: HARRIS CORPORATION, Melbourne, FL (US)

(72) Inventors: John W. Nieto, Rochester, NY (US); Carl Petruzelli, Fairport, NY (US); Brian C. Padalino, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 14/525,757

(22) Filed: Oct. 28, 2014

(51) Int. Cl.
| | | |
|---|---|---|
| *H03D 1/04* | (2006.01) |
| *H03D 1/06* | (2006.01) |
| *H03K 5/01* | (2006.01) |
| *H03K 6/04* | (2006.01) |
| *H04B 1/10* | (2006.01) |
| *H04L 1/00* | (2006.01) |
| *H04L 25/08* | (2006.01) |
| *H04B 1/71* | (2011.01) |
| *H04B 1/7103* | (2011.01) |

(52) U.S. Cl.
CPC ............ *H04B 1/7102* (2013.01); *H04B 1/7103* (2013.01)

(58) Field of Classification Search
CPC ...... H04B 1/7102; H04B 1/7103; H04B 1/71; H04B 1/7107; H04B 1/71072
USPC ................. 375/346, 148, 229, 232, 285, 350; 455/63.1, 296
See application file for complete search history.

(56) References Cited

U.S. PATENT DOCUMENTS

| | | | | |
|---|---|---|---|---|
| 5,612,978 A * | 3/1997 | Blanchard et al. | ............ | 375/350 |
| 6,246,729 B1 * | 6/2001 | Richardson | ................... | 375/324 |
| 6,975,673 B1 * | 12/2005 | Rouquette | ..................... | 375/149 |
| 7,277,475 B1 * | 10/2007 | Nguyen et al. | ................ | 375/148 |
| 7,512,197 B2 * | 3/2009 | Furman et al. | ................ | 375/346 |
| 7,860,476 B1 * | 12/2010 | Karr et al. | ...................... | 455/296 |
| 8,059,768 B2 * | 11/2011 | Zhao et al. | .................... | 375/346 |
| 8,068,531 B2 * | 11/2011 | Zhao et al. | .................... | 375/130 |
| 8,787,142 B2 * | 7/2014 | Cyranka et al. | ............... | 370/204 |
| 2005/0047487 A1 * | 3/2005 | Sakaue et al. | ................. | 375/148 |
| 2006/0176983 A1 * | 8/2006 | Wadsworth et al. | ......... | 375/343 |
| 2008/0095256 A1 * | 4/2008 | Primo et al. | .................. | 375/260 |

OTHER PUBLICATIONS

Davidovici, Sorin et al., Narrow-Band Interference Rejection Using Real-Time Fourier Transforms, IEEE Transactions on Communications, vol. 37, No. 7, Jul. 1989, pp. 713-722.

(Continued)

*Primary Examiner* — Phuong Phu
(74) *Attorney, Agent, or Firm* — Robert J. Sacco, Esq.; Fox Rothschild LLP

(57) ABSTRACT

A filter for a radio receiving device doubles a sample size of a digital baseband signal to form an enhanced data set and after widowing performs a Fast Fourier Transform (FFT) to facilitate calculation of instantaneous magnitude values and average magnitude values for each of a plurality of frequency bins. A noise floor is calculated based on the average magnitude values of a plurality of the frequency bins, and the noise floor is then used to identify frequency bins which contain an interfering signal. If it is determined that a frequency bin contains spectral energy associated with an interfering signal, then the instantaneous magnitude value of the frequency bin is selectively reduced, after which an inverse FFT operation and inverse window operation is performed.

23 Claims, 2 Drawing Sheets

(56) References Cited

OTHER PUBLICATIONS

DiPietro, Robert C., An FFT Based Technique for Suppressing Narrow-Band Interference in PN Spread Spectrum Communciations Systems, 1989 Interantional Conference on Acoustics, Speech, and Signal Processing, 1989, ICASSP-89, May 23-26, 1989, pp. 1360-1363.

Gevargiz, John et al., Adaptive Narrow-band Interference Rejection in a DS Spread-Spectrum Intercept Receiver Using Transsform Domain Signal Processing Techniques, IEEE Transactions on Communications, vol. 37. No. 12, Dec. 1989, pp. 1359-1366.

Howard, Steven J., Narrowband Interference Rejection using Small FFT Block Sizes, Raytheon Company, 1992 (5 pages).

* cited by examiner

METHOD OF ADAPTIVE INTERFERENCE MITIGATION IN WIDE BAND SPECTRUM

BACKGROUND OF THE INVENTION

1. Statement of the Technical Field

The inventive arrangements relate to wireless communication systems and more particularly to interference mitigation in wide-band communication signals.

2. Description of the Related Art

Wireless communication systems include receivers and transmitters that are arranged to facilitate communications using radio frequency signals. In a spread spectrum wireless communication system, pseudo random sequences (PRS) and/or Walsh modulation of a digital data signal can be used to spread the signal energy of a transmitted signal over a relatively wide bandwidth. Among other advantages, such spreading can reduce the negative impact of interference in the communication channel (as long as the interference is smaller than the processing gain of the spread signal). The improvement is most noteworthy in scenarios where the interfering signal is narrow-band in nature as compared to the signal of interest. The process of demodulating the spread spectrum signal inherently has the effect of spreading the energy of the narrow-band interfering signal over the full spread spectrum signal bandwidth, thereby reducing the effect of the interference. Further, various digital processing techniques have been developed which facilitate the excision or suppression of narrow-band interferers in spread spectrum signals. These methods include adaptive filter designs which operate in the time domain and in the frequency domain. In addition, spread systems can also be used to allow multiple users to share the same frequency (e.g. WCDMA and UMTS cellular systems).

In systems that perform filtering operations in the time domain, linear prediction methods are commonly used. Interference is predicted by an adaptive Finite Impulse Response (FIR) filter and is subtracted from the received signal. In systems that perform filtering operations in the frequency domain, the digital data samples are first converted from the time domain into the frequency domain via the well-known Fast Fourier Transform (FFT). Thereafter, narrow-band interference can more easily be recognized because the energy of the interfering signal is concentrated in a smaller bandwidth. Once the interference is mitigated, the digital data samples are converted back to the time domain via an Inverse FFT (IFFT). A subset of this method uses a time-varying FIR filter which adjusts its coefficients based on the estimate of the interferer's instantaneous frequency.

A conventional narrow-band excision system that operates in the frequency domain will commonly include several basic components. Such components can include an FFT based transformer, a power estimator, an excisor and an IFFT based inverse transformer. The transformer can include a windowing function to reduce the effects of spectral leakage, as is known in the art. The power estimator in such systems receives frequency domain data from the transformer and uses this information to determine a power vector. The excisor receives the frequency domain data from the transformer and is adapted to excise selected frequency bins from the frequency domain data. More particularly, the excisor selectively removes the narrow-band interference from the frequency domain data based on a determination of whether the power vector exceeds an excision threshold. After the frequency domain data has been processed by the excisor, it is communicated to the inverse transformer where it is converted back to the time domain. Note that narrow-band interference can cover a wide range of bandwidths up to ⅕ of the spread waveform bandwidth.

SUMMARY OF THE INVENTION

Embodiments of the invention concern a filter device for adaptive interference mitigation in a wideband communication system. The invention also concerns a radio receiving system and a method for filtering a time domain data signal in a radio receiving apparatus. The method which is implemented in the filter and receiving apparatus involves receiving a digital baseband signal data. For example, such a signal can be received from a radio receiving apparatus. Thereafter, at least one electronic circuit in a filter device is used to perform several filtering operations. These operations begin by first gathering a block of baseband received samples and using a previous received block of baseband samples to double the block size to form an enhanced data set. More specifically, this enhanced data set is obtained by concatenating samples from a current block of time domain samples with an immediately preceding block of time domain samples. Thereafter, a windowing function is applied to this enhanced data set. Next, a Fast Fourier Transform (FFT) operation is performed using the enhanced data set so as to obtain a plurality of FFT samples. Each FFT sample is comprised of an instantaneous frequency bin value which includes a real in-phase part and an imaginary quadrature part. The FFT samples are subsequently used to calculate an instantaneous magnitude value and an average magnitude value for each frequency bin based on the plurality of instantaneous frequency bin values.

The filter operations further include calculation of a noise floor based on the average magnitude values of a plurality of the frequency bins. The calculated noise floor is then used to identify at least one frequency bin which contains spectral energy associated with an interfering signal. The instantaneous frequency bin value of at least one frequency bin is thereafter reduced if it is determined that the frequency bin contains spectral energy associated with an interfering signal. After such reducing, the at least one electronic device performs an inverse FFT operation based on the instantaneous frequency bin values to calculate a notched time domain digital data set in which spectral components of the interfering signal have been reduced. Further, an inverse operation is performed to the notched time domain digital data set to reverse the effect of the windowing function applied earlier in the process. Note that if no interfering signal is present, the desired behavior is that very few or no frequency bins are reduced.

According to one aspect, the instantaneous magnitude values and average magnitude values which are used in the processing described herein are exclusively comprised of frequency bin amplitude levels rather than frequency bin power levels. Further, the instantaneous magnitude value for each of the frequency bins is calculated using a magnitude estimating algorithm that is computationally less intensive as compared to an actual magnitude calculation in which an exact value of instantaneous magnitude is calculated. Further, the average magnitude value referenced above is calculated by using an averaging filter. The averaging filter calculates an estimated average magnitude for each frequency bin using a computationally less intensive method as compared to an actual averaging calculation in which a true average value is obtained. Each average magnitude value is then converted to log scale to obtain a plurality of log scale average magnitude values. Thereafter, the plurality of log scale average magnitude values are used to calculate the noise floor.

The identification of frequency bins which contain spectral energy associated with an interfering signal is accomplished by identifying those frequency bins in which the average magnitude value calculated for the frequency bin exceeds the noise floor by a predetermined amount. The reduction or adjustment of each instantaneous frequency bin magnitude value can involve determining one of a plurality of signal magnitude ranges for each frequency bin having an average magnitude value exceeding the noise floor by the predetermined amount. Then, based on the signal magnitude range determined for each frequency bin, an adjustment factor is chosen for that bin. The adjustment factor is set in accordance with a mask value which determines the adjustment to be applied to selectively reduce the real in-phase part and the imaginary quadrature part. Finally, a time domain output sample set produced by the inverse FFT operation is reduced so that the output time domain data is limited to include only the middle half of the output samples (after applying inverse window function).

BRIEF DESCRIPTION OF THE DRAWINGS

Embodiments will be described with reference to the following drawing figures, in which like numerals represent like items throughout the figures, and in which.

DETAILED DESCRIPTION

Figure 1:
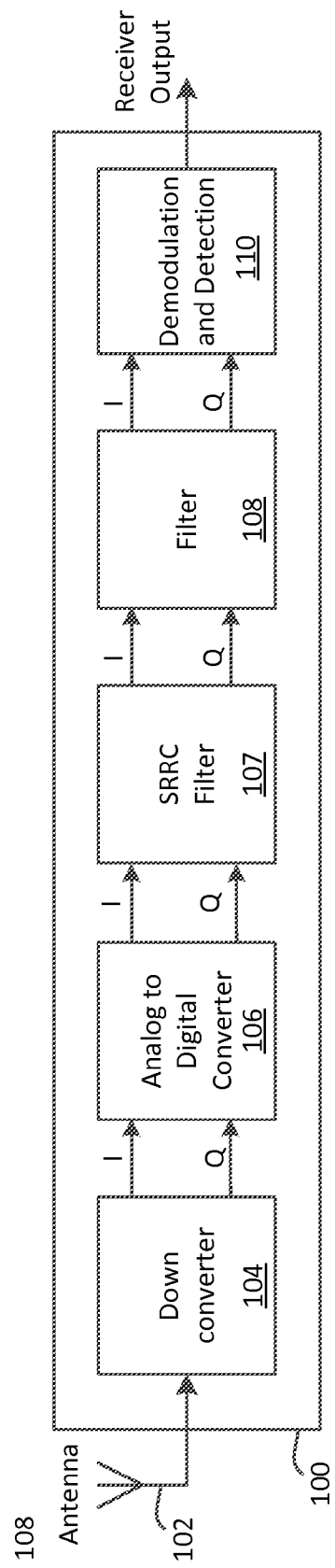
FIG. 1 is a simplified block diagram of a receiver which is useful for understanding adaptive interference mitigation methods and systems in accordance with the inventive arrangements.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The inventive arrangements concern communications methods and apparatus for adaptive interference mitigation of narrow-banded signals in a wide-band spectrum. The invention also concerns a digital filter apparatus that is useful for cancellation of unwanted signals (especially narrow-band signals) in a wide-band or spread spectrum communications environment. The adaptive interference mitigation filter disclosed herein advantageously provides excellent interference mitigation performance while reducing required memory resources as compared to conventional adaptive filter designs. As such, the methods and apparatus disclosed herein are especially well suited for portable wireless communications equipment where hardware resources, such as memory, are limited.

An important consideration when designing systems for adaptive interference mitigation in wide-band communications systems is the relative effectiveness of interference mitigation performance as compared to other known methods and systems. A second consideration is the relative amount of hardware resources that are needed to implement the particular interference mitigation technique. In this regard it will be appreciated that wireless communications systems (especially portable systems) will usually have only limited amounts of processing power and memory resources available for excision processing. The inventive arrangements advantageously provide improvements in narrow-band signal excision performance as compared to conventional interference excision filters, while greatly reducing hardware and memory utilization needed to implement such filtering. This result is accomplished by a combination of signal processing techniques which vary from conventional processing methods and processing steps ordered in novel ways to accomplish the goal of interference excision.

FFT processing with no windowing (i.e. using a rectangular window) has great disadvantages when large interferers are present due to the spectral leakage of the interfering signal over a wider bandwidth (possibly over the entire spectrum). One solution to this problem involves filtering a time-domain signal through a filter bank (a set of band-pass filters in parallel). Multi-bank filtering reduces spectral leakage of large interferers in the frequency-domain at the cost of significant computer memory, delay and FPGA (Field Programmable Gate Array) hardware requirements. Windowing of input samples to FFT can reduce spectral leakage but this improvement comes at the cost of spreading the main lobe of the interfering signal.

The inventive arrangements advantageously address the spectral leakage problem by performing a windowing operation at the input to FFT (instead of multi-bank filtering). Thereafter, to reduce problems associated with spreading of the main lobe of large interferers as caused by the windowing function, the input sample size of the FFT is increased (e.g. doubled) by using old time-domain samples (i.e. a block of sample data from an immediately previous sampling period) together with a new or current set of time domain samples from a current sampling period. Once the FFT has been executed, the average instantaneous magnitude of each frequency-domain bin is obtained using a simple filter. The average magnitude array which has been calculated is then stored in memory. The array values are stored and processed in the magnitude domain (instead of the power domain) to reduce bit precision requirements of an FPGA used to perform such processing. By processing the data exclusively in the magnitude domain (instead of the power domain) only half as many bits are required for math operations (e.g., 18 bits instead of 36 bits) while maintaining same dynamic range.

Concurrent with storing the array of average magnitude values in memory, an average noise floor is computed. The size of the array needed to compute the noise floor is reduced by converting the array values to log scale. After the noise floor has been calculated, the noise floor value which has been calculated is converted back to the linear domain. Once this value is obtained, adjustments are made to the instantaneous frequency bin values for excision purposes.

Signals of interest are generally expected to have signal magnitudes below or equal to the noise floor. Accordingly, when an average magnitude value calculated for a particular frequency bin i exceeds the noise floor by a certain threshold amount, such frequency bin is identified as containing an interfering signal that should be excised. In that case, the corresponding instantaneous value of the particular bin i for a particular block of data is automatically adjusted in accordance with an excision algorithm and masking process which is designed to reduce the interference. After the instantaneous magnitude values have been adjusted in this way, they are transformed back to time domain data using an inverse FFT (IFFT) function. An inverse of the previously applied window function is then used to scale each time domain value properly. The time domain samples that are finally output from the filter are thereafter limited to only those samples located in the middle of the IFFT in order to provide those samples that are most reliable.

Referring now to FIG. 1, there is illustrated a simplified block diagram of a wireless communication receiver 100 used in wide-band communications systems. As will be readily understood by those skilled in the art, exemplary wide band communication systems can include direct sequence spread spectrum communications. The receiver can be connected to an antenna 102 for receiving radio frequency (RF) signals over a wide range of frequencies. The receiver includes a down-converter 104 for down-converting received wide-band RF signals to baseband and for generating quadrature analog I/Q baseband signals. The quadrature signals from down-converter 104 are communicated to an analog to digital (A/D) converter 106 which converts the baseband analog I/Q signals to digital form. The digitized I/Q signals are then communicated to square-root raised cosine (SRRC) filter 107. As is known in the art, an SRRC filter can advantageously help to minimize intersymbol interference (ISI). An SRRC filter is commonly used in both a transmitter and a receiver in a digital communication system. The two filters in combination provide a matched filtering operation that minimizes ISI. After being processed in the SRRC filter 107, the digitized I/Q signal samples are communicated to filter 108. Filter 108 performs filtering operations as hereinafter described to remove unwanted signals. After such filtering operations, the resultant filtered signal is communicated to demodulation and detection component 110 where wideband signals (e.g. spread spectrum signals) are detected and demodulated. Receiver components such as down-converter 104, A/D converter 106, SRRC filter 107 and demodulation and detection component 110 are all well known in the art and therefore will not be described in detail.

Figure 2:
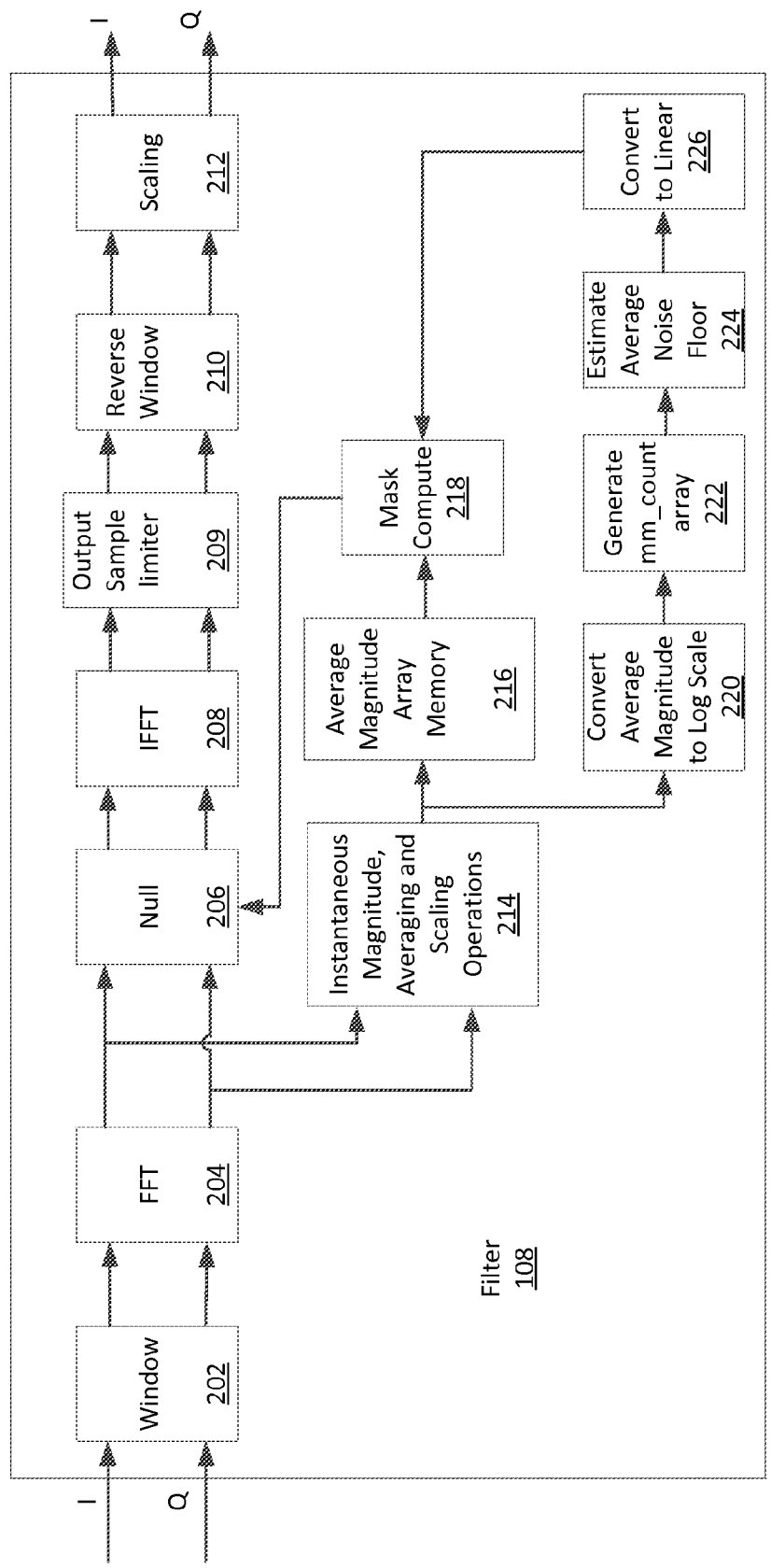
FIG. 2 is a block diagram of an adaptive interference mitigation system that is useful for understanding the invention.

Referring now to FIG. 2, there is illustrated a more detailed block diagram which is useful for understanding the operation of filter 108. The filtering process begins at block 202 where a windowing function is applied to the received I/Q data. The use of windowing functions is well known and therefore will not be described in detail. However, a brief explanation is provided to assist in the reader's comprehension of the inventive arrangements.

When signals are converted from the time domain to the frequency domain using an FFT process, the digitized time domain data is sampled into the FFT processor (e.g. FFT processor 204) on a block by block basis as is known. Each block of digitized time domain data is comprised of a fixed number of data points in the digital time record which represent the received RF signal during some brief predetermined period of time. The FFT uses the received block of digitized time domain data to then compute the corresponding frequency domain data for the time period. The FFT performs this operation one block at a time.

An assumption inherent in FFT processing is that the time domain data is periodic in each block. When an FFT is computed for a time domain signal that is not actually periodic, the resulting frequency domain data is less than optimal and is said to suffer from spectral leakage. As a practical matter spectral leakage is manifested by distortions that appear in the frequency domain spectrum. These distortions cause it to be more difficult to discern the true frequency components that are present in the digitized time domain signal. In practice, most signals are not periodic during the predetermined time period associated with each block of digitized data sampled by the FFT. Accordingly, the resulting conversion of such non-periodic data to the frequency domain in the FFT processor will generally produce spectral leakage.

In order to minimize the distortions associated with spectral leakage, a windowing function is applied to the digitized time domain data. Windowing is a well-known signal processing technique that can allow a non-periodic signal to appear to be periodic so as to minimize or prevent problems associated with spectral leakage. Windowing involves selectively weighting each of the digital data samples during the time associated with each block of digital data so that the magnitude data is forced to begin at close to or equal to zero and end close to or equal to zero magnitude. Between the beginning and the end of each sample time period, the window will have some predetermined shape which will vary as a function of time. The shape defined by the time varying window function will determine the effects that the window will have on the resulting output data in the frequency spectrum. Differently shaped windows will have different characteristic effects on the resulting frequency domain data.

In general, the spectral leakage that occurs in the absence of windowing can have the negative effect of spreading an interfering signal over a spectral band of interest, which may mask important spectrum details of lower level signals. Windowing can reduce such spreading but also has certain drawbacks. For example, windowing can spread the main lobe of an interfering signal, requiring the removal of more frequency bins than would be required if windowing was not applied. In fact, if the power level of the interfering signal is very large compared to the noise and desired signal, the interferer can spread over many or all frequency bins.

In the inventive arrangements herein, windowing is applied at 202 so as to reduce spectral leakage. For example, the well-known Kaiser window function (also known as the Kaiser-Bessel window) can be used for this purpose. The Kaiser-Bessel window is a family of windows that can provide different spreading of the main lobe such that multiple different windows could be used in connection with the inventive arrangements described herein, depending on the size of interferers. For example, if the interferers are small, a window with less main lobe spreading (less reduction of energy outside of main lobe) could be used. If interferer is very large, a window which spreads the main lobe but reduces more energy outside of the main lobe could be used (as is known in the art). In order to counteract the known negative effects of the windowing operation, the size of the data set used for the FFT is increased. In particular, the FFT block 204 performs its transform operation using both a current block of digital time domain data concatenated with the previous block of digital time domain data in order of received samples, thereby effectively doubling the length of the time domain data block used for FFT transformation, while not increasing the time between FFT blocks. (For example, let A be the first block of 1024 samples received, B the second and C the third and D the fourth. Blocks are placed into FFT input in following order: B|A, C|B, D|C). In general, an N point input time domain data sequence will produce an N point frequency response. As such, increasing the size of the FFT input data set in this way will generally serve to improve the FFT frequency measurement resolution (the sample rate remains unchanged, and there are now twice as many frequency bins in FFT and the bin spacing for an FFT is Sample_Rate/N).

For example, assume that each block of time domain data contains 1024 samples. According to one aspect of the invention, the FFT point size is doubled (N is increased to 2048 rather than 1024) by including the immediately previous block of time domain data in the transform operation performed at FFT module 204. This will result in an N point frequency response, where N=2048 in this example. Notably, the old (previous data block) time-domain samples are used together with the new (current data block) time-domain samples such that only 1024 samples are new samples into the FFT. By doubling the FFT size, the spreading of the main lobe due to windowing is effectively reduced by half.

After transformation to the frequency domain at FFT 204, the instantaneous magnitude of each frequency bin is calculated. In the inventive arrangements, the FFT is an N-point complex FFT. Each FFT output sample, consisting of an in-phase and quadrature part, represents an instantaneous frequency bin value. Once the FFT has been executed in FFT 204, the process continues on to 214 where an average magnitude value is obtained for each frequency-domain bin. Block 214 actually comprises several steps. These steps include scaling instantaneous frequency bin values, calculations to determine a magnitude based on the instantaneous frequency bin values, and using the instantaneous magnitude values to determine an average magnitude value for each frequency bin. Each of these intermediate steps is described below in further detail.

Before the array of average magnitude values can be calculated in block 214, certain scaling operations are needed. As is known in the art, a fixed-point digital signal processor (DSP) can be used to perform the FFT calculations described herein. Fixed-point DSPs are advantageous for use in many applications because they are highly programmable and relatively cost efficient. Still, one disadvantage of fixed-point DSPs is that they usually have a limited dynamic range. To overcome this problem the DSP can advantageously perform processing to automatically scale the instantaneous frequency-domain bin values which are outputs of the FFT operations described herein. In particular, the instantaneous frequency-domain bin values are scaled using a scale factor which is computed for the current FFT. Such automatic scaling methods are known in the art and therefore will not be described here in detail. This automatic scaling performed by FFT and IFFT has to be corrected in order for input sample amplitudes to remain unaffected after FFT/IFFT chain (block 212). In addition, Block 212 also corrects for gain of N that FFT/IFFT naturally produces. Although DSPs were used to describe fixed-point math and auto-scaling, FPGAs performing FFTs also use automatic scaling to extend the dynamic range of a fixed-point FFT algorithm.

After scaling, an average magnitude value is obtained for each frequency-domain bin. The average magnitude value is advantageously calculated using a simple filter. An exemplary filter used for this purpose can be represented as follows:

$$\text{average\_mag\_bin}(i) = (\text{average\_mag\_bin}(i)*(1-\alpha) + (\text{instantaneous\_mag\_bin}(i)*\alpha))),$$

where:
average_mag_bin(i) is the current average bin value for bin i,
instantaneous_mag_bin(i) is the scaled instantaneous magnitude value of bin (i), and
$\alpha$ is a weighting factor.

In the foregoing calculation, the instantaneous magnitude value (i.e, instantaneous mag_bin(i)) can use a simple approximation of magnitude as long as it algorithm approximating the magnitude of a complex number provides sufficient accuracy for this invention (i.e. simulations with exact magnitude and approximation are shown to yield similar results). For example, a suitable approximation for the instantaneous magnitude calculation can be represented as follows:

$$\text{instantaneous\_mag\_bin}(i) = (\max(\text{abs}(\text{real}), \text{abs}(\text{imag})) + \min(\text{abs}(\text{real}), \text{abs}(\text{imag}))*0.5),$$

where
(max(abs(real), abs(imag)) is the larger value selected as between the absolute value of the real (in phase part) and the absolute value of the imaginary (quadrature part) of each FFT sample, and
(min(abs(real),abs(imag)) is the smaller value selected as between the absolute value of the real (in phase part) and the absolute value of the imaginary (quadrature part) of each FFT sample.

It will be appreciated that the foregoing calculation used to compute instantaneous magnitude is selected for its processing efficiency so as to minimize the memory and processing load. Similarly, the above-described filter used for calculating average bin magnitude is selected for its processing efficiency. Accordingly, these methods are presently preferred for purposes of implementing the inventive arrangements in a portable communication device where hardware resources (for processing and memory) are limited. Still, it should be appreciated that the invention is not limited to the particular methods described herein for calculating instantaneous magnitude and/or average magnitude. Instead, alternative methods can also be used for calculating these values provided that they are highly efficient.

Note that the instantaneous and average frequency bin values referenced herein are advantageously processed as magnitude (amplitude) values rather than as power levels. In a conventional adaptive interference mitigation process, there are well known advantages associated with representing signal levels in the power domain. But representing and manipulating signals in the power domain requires a relatively large number of data bits because there exists a squared relationship between signal magnitude and signal power. This inevitably results in a much greater range of values being needed to represent signal levels over a given dynamic range when those signals are represented in terms of their power levels as opposed to their magnitude levels. Because of the squared relationship between magnitude and power, two signals that are only moderately different in magnitude can be significantly different in terms of their power levels. The inherently wider range of values encountered when performing computations in the power domain will therefore require significantly more data bits for math operations. Accordingly, frequency domain data representations with the inventive arrangements are advantageously constrained to the magnitude domain. This reduces memory utilization for storing data values and when performing calculations, while maintaining the same dynamic range of the filter hardware. Consequently, the hardware resources needed to implement the filter 108 are advantageously reduced.

After the instantaneous magnitude value for each frequency bin i is scaled and averaged in 214, the averaged magnitude values are stored in average magnitude value array memory 216. Concurrent with storing such average magnitude value array in memory, the average magnitude values for each frequency bin are used in steps 220, 222, 224 and 226 to calculate an average noise floor as described below. This concurrent operation allows the noise floor computation to begin as soon as possible and also saves the time required to store and then read back the average magnitudes from the average magnitude value array in memory. The noise floor calculation process begins at 220 where the average magnitude values for each frequency bin are converted to log scale at processing block 220. In particular, we calculate the logarithm base 10, of the average magnitude value of each frequency bin to obtain a log_fft value:

$$\text{log\_fft}(i)=10*\log 10*\text{average\_mag\_bin}(i)$$

where average_mag_bin(i) is the average magnitude value for bin i. As shall be explained below in further detail, converting magnitude values to log scale reduces the memory resources required by the filter 108 because a much smaller array of values is required for noise floor computations described below. For example, by converting each of the instantaneous frequency bin magnitude values to the log 10 scale, only 50 values are needed to represent any magnitude value over a dynamic range of 100 dB. This reduces the memory requirements for our system at processing blocks 222 and 224.

There are several different methods by which an average noise floor can be calculated or estimated. However, as a practical matter, many of these methods are not well suited for use in an FPGA type device. In order to understand a method used herein for determining an average noise floor, we will first describe our basic approach to the problem and then describe a more efficient implementation which is used at blocks 222 and 224.

For purposes of understanding our basic approach, recall that for a predetermined number of frequency bins, there will be expected signal and/or noise component present at the frequency of the bin. Accordingly, the average magnitude values of the frequency bins where no interfering signal is present can serve as a good estimate of an average noise floor (where noise floor can also be viewed as desired signal floor as well if no noise is present). Consequently, one simple approach for calculating the noise floor would involve (1) sorting all the predetermined frequency bins to find a subset (e.g. 32 frequency bins) with the smallest average magnitude values from among all of the predetermined frequency bins, (2) adding those average magnitude values together to obtain a sum, and then (3) dividing the sum by the number of bins in the subset (e.g., 32 bins) to obtain an average noise floor (or signal floor). Although many other techniques exist for computing the noise floor (finding the median value, performing complicated sorts looking for different magnitude modes), it has been found that averaging the smallest 32 bins has provided very good results and is straightforward to implement, especially when unknown interferers may be present in the frequency band where the desired signal is and can occupy large portions of the spectrum.

Continuing with this idea, recall from the description of FIG. 1 that the time domain I/Q data samples are pre-filtered at SRRC filter 107 (to reduce ISI) before the samples are communicated to filter 108. Assuming that the SRRC filter 107 and the corresponding SRRC filter used in the transmitter each has an excess bandwidth of 0.22, then the (signal+noise) frequency bins of greatest interest will be those which are located in approximately the first quarter and last quarter of the FFT. For example, in a scenario where N=2048, the bins of primary interest would be bins 0-450 and bins 1598-2047. Also, recall that the first half of the FFT samples represent positive frequencies and the last half negative frequencies due to the periodicity of the FFT around the sample rate and the fact that the signal is centered around 0 Hz).

Given the foregoing, and using the basic approach described above, one would sort the first quarter and last quarter bins (e.g. bins 0-450 and bins 1598-2047 in a scenario where N=2048) to find the 32 bin values with smallest magnitudes, add those magnitude together and then divide by 32 to obtain an average. Still, there are certain practical difficulties to implementing the basic approach described herein. For example, sorting data in an FPGA is difficult and therefore identifying the 32 bin values with smallest magnitude is not a simple task. Accordingly, we take a different approach to simplify processing, which shall be described in more detail in the following paragraph. Briefly, we create an array mm_count in which array index values are used to reference positions within the array. We choose the set of array index values to correspond to the set of all of the possible frequency bin average magnitude values. As an example, assume that an average value of a frequency bin can be any integer value between 1- and 50. In such a scenario, the array index values could include the values 1 through 50.

Initially, each position in the array that is referenced by an index value i is set to zero (i.e. mm_count[i]=0 for all values of i (1-50). We then scan the actual list of average magnitude values for all of the frequency bins (e.g. bins 0-450 and bins 1598-2047 in a scenario where N=2048) to determine how many times a particular average magnitude value appears or is attributed to the total set of frequency bins. Stated differently, it can be said that we determine how many frequency bins actually have a particular magnitude value. In order to accomplish this result, the average magnitude values for the frequency bins are scanned. When a frequency bin is determined to have a particular average magnitude value, the corresponding index value in the array mm_count is incremented by one, i.e. mm_count[i]=mm_count[i]+1.

For example, assume that all mm_count[i] are initially set to zero. As the average magnitude values of each frequency bin are scanned, it is noted that a particular frequency bin has an average magnitude value of 17. Accordingly, we increment mm_count[17] by one. If this happens to be the first time in the scan that a frequency bin has been encountered with an average magnitude of 17, and all mm_count[i] are initialized to zero, then $$\text{mm\_count}[17]=\text{mm\_count}[17]+1.$$

$$\text{mm\_count}[17]=0+1=1$$

If a second frequency bin is scanned that also has the same average magnitude value (i.e., average magnitude value 17 in this example), then the same corresponding index value in the array is again incremented by one:

$$\text{mm\_count}[17]=\text{mm\_count}[17]+1$$

$$\text{mm\_count}[17]=1+1=2$$

The result will be a table or array that specifies how many times each average magnitude value appears among the frequency bins. Stated more generally, we will have an array in which $$\text{mm\_count}[i]=F_i$$

Where $F_i$ is the final increment value representing the number of times that a particular average magnitude value has occurred among all of the frequency bins under consideration.

For example, in the exemplary array shown below, mm_count[4]=2. This means that mm_count[4] has a final increment value $F_4$=2 (i.e., there are two frequency bins which have an average magnitude value of 4). Similarly, mm_count[19]=3 means that mm_count[19] has a final increment value $F_{19}$=3, which is to say that there are three frequency bins that have an average magnitude value of 19.

mm_count[1]=0 mm_count[2]=1 mm_count[3]=1 mm_count[4]=2 mm_count[5]=0 mm_count[6]=2

.

.

.

mm_count[17]=2 mm_count[18]=1 mm_count[19]=3 mm_count[20]=3 mm_count[21]=2 mm_count[22]=3

.

.

.

mm_count[47]=2 mm_count[48]=1 mm_count[49]=0 mm_count[50]=1

After all of the $F_i$ array values have been determined, the process could continue by calculating the sum of the final increment values beginning with index zero (1). Index value one corresponds to the lowest possible average power level in this example. Accordingly, we can begin with index mm_count[1], corresponding to the lowest average magnitude, and sum the corresponding $F_i$ values for each subsequent index in the array, until the sum S of the $F_i$ values exceeds a specified subset value (until S≥subset value). Thereafter, the average noise floor can be calculated by taking the average of the magnitude values comprising the subset. Since the index values correspond to the frequency bin magnitude values, we would calculate an average of those index values to determine the noise floor.

For example, in the foregoing exemplary mm_count array, assume that we wish to calculate the average noise floor using a subset value=6, where the subset is comprised of the frequency bins having the six lowest average magnitude values. In that case, we would calculate a sum starting with the final increment value $F_i$ for index 1 and continuing with each subsequent index value until the sum S of the $F_i$ values is equal to or exceeds the subset value. Recall that mm_count[i]=$F_i$, so in the foregoing example where the subset value=6, the process would be as follows:

Index 1→S=mm_count[1]=$F_1$=0

Index 2→S=mm_count[1]+mm_count[2]=1

Index 3→S=mm_count[1]+mm_count[2]+mm_count[3]=2

Index 4→S=mm_count[1]+mm_count[2]+mm_count[3]+mm_count[4]=4

Index 5→S=mm_count[1]+mm_count[2]+mm_count[3]+mm_count[4]+mm_count[5]=4

Index 6→S=mm_count[1]+mm_count[2]+mm_count[3]+mm_count[4]+mm_count[5]+mm_count[6]=6

At this point, the sum S of the final increment values $F_i$ exceeds the subset value (i.e., S≥subset value) and the summation ends. Note that this process is effectively the same as sorting all the values and finding the subset of average magnitude values which are the smallest. Further, since it is now known how many times each of these smallest average magnitude values occurred, it is possible to compute the average noise floor value by using the index values (which actually correspond to average magnitude values) and the mm_count[i]=$F_i$ values which specify the number of times each value occurred. Accordingly, an average noise floor can be calculated as follows:

$$\text{Noise\_Floor}=(2*\text{mm\_count}[2]+3*\text{mm\_count}[3]+4*\text{mm\_count}[4]+6*\text{mm\_count}[6])/S \quad (1)$$

Note that since mm_count[i]=$F_i$, this can also be represented as $$\text{Noise\_Floor}=(2*F_2+3*F_3+4*F_4+6*F_6)/S \quad (2)$$

In the foregoing example, a relatively small subset value of 6 was used to simplify the discussion. In a scenario where N=2048, the bins of primary interest would be bins 0-450 and bins 1598-2047, corresponding to a total of 900 frequency bins. In such a scenario, it has been found that a subset of 32 bins having the lowest average magnitude values (i.e., subset value=32) can be sufficient for purposes of calculating an accurate estimate of the average noise floor using this technique.

The method described above can greatly improve processing efficiency when attempting to determine average noise floor in certain computing environments (e.g. in an FPGA). But it is possible to obtain further processing efficiencies in a scenario where the average magnitude values used as index values in mm_count array are actually log scale representations of the linear average magnitude values for each frequency bin. In that case, we can avoid the final step of calculating average noise floor as shown above in equations (1) and (2). Instead, we simply identify the index value corresponding to the condition where subset value, and then use that index value as our noise floor estimate. In the example above, the final mm_count[i] corresponding to the condition where S≥subset value is mm_count[6], in which the index value i=6. Accordingly, we would estimate the noise floor magnitude to be 6, corresponding to the index value i.

In order to more fully understand this process, recall that each index value used in the mm_count array actually corresponds to an average magnitude value. Where these average magnitude values are actually log scale representations of the true linear average magnitude values accorded to each frequency bin, the index value corresponding to the condition where S≥subset value is actually a close approximation of the average noise floor, provided that the subset value is properly selected. As noted above, where N=2048, the frequency bins of primary interest would be bins 0-450 and bins 1598-2047, corresponding to a total of 900 frequency bins. In such a scenario, when a subset value of 32 is selected, the actual index value corresponding to the condition where S≥subset value has been found to provide an accurate estimate of the average noise floor. Of course, different values of N may require a different subset value to provide accurate results. However, as a general rule, it can be said that the subset value to use should be chosen to contain a meaningful subset of the bins where signal and/or noise components are expected to be while allowing for large interferers to occupy a significant portion of the spectrum. Note that the threshold value chosen for determining an interference signal will also influence the choice of subset value and allows for some flexibility in the selection of parameters. Software simulations with expected signal, noise and interference can also aid in the proper selection of the subset value and threshold value.

Referring once again to FIG. 2 the noise floor estimation process is represented in blocks 222 and 224. Block 222 represents the steps described above which involve generating the mm_count array, scanning the frequency bins and calculating the $F_i$ values for each index value. Block 224 represents the second part of the process in which an estimate of the noise floor is obtained. In the embodiment described herein where the average magnitude values have been converted to log scale in processing block 220, this would involve estimating the noise floor using the mm_count array by determining the mm_count[i] index value where S≥subset value as described above. Once an average noise floor value has been determined in block 224, the average noise floor (which is still in log scale form) is increased by a threshold value (for example 8) and then converted back to linear scale in block 226 using an inverse log function. The average noise floor information is then passed to the mask compute block 218.

The noise floor in a spread spectrum communication system is actually a combination of noise and signal, since the signal of interest is usually below the noise floor. In fact, when a received signal exceeds the average noise floor by a predetermined amount, that fact alone can be taken as an indicator that the signal is not a signal of interest. Taking this concept one step further, we can assume for the purposes of the filter described herein that signals which exceed the noise floor by a predetermined amount are interfering signals. Accordingly, at block 218 we selectively determine how the magnitude of instantaneous signal samples in each frequency bin are to be adjusted based on the extent to which the average magnitude value of that frequency bin exceeds the noise floor.

At block 218, the instantaneous magnitude value for bin i which flows from block 204 to 208 via the nulling block is selectively adjusted (reduced) by the nulling block (206) if the average magnitude value for that bin (i.e., average_mag_bin(i)) exceeds the noise floor by some predetermined amount. The rationale is that if the average_mag_bin(i) exceeds the noise floor by some predetermined amount, then that bin most likely contains energy from interferers and should be reduced in magnitude. One approach to this problem would be to simply zero out the instantaneous value of bin i if the value exceeds the noise floor by some predetermined extent. However, it has been found that this relatively simple approach can be sub-optimal for certain types of interfering signals. Accordingly, at block 218 it is advantageous to have a plurality of different possible adjustments to the instantaneous values of each frequency bin i. An adjustment to an instantaneous magnitude value for each frequency bin i is specified by a mask value which is determined at 218. The mask value is selected depending on the extent to which the calculated average magnitude value for that bin exceeds the noise floor. Thereafter, the instantaneous values of each frequency bin are adjusted in accordance with the mask value which has been determined.

In an exemplary arrangement, an average magnitude value for a bin i can be categorized into one of four different predetermined signal magnitude ranges. In such a scenario, one of four mask values can be assigned to a particular bin i. The mask value assigned will depend on the signal magnitude range into which the average magnitude value for a particular bin i falls. The mask value will determine the adjustment (if any) to be applied to the instantaneous values for that bin i. Also, to avoid the necessity of calculating a noise floor value instantaneously, the noise floor calculated for a previous FFT block (e.g., for an immediately previous block of FFT data) is stored and used for current FFT/IFFT block processing while computing noise floor for next block.

In an exemplary arrangement, the four magnitude ranges used for evaluating the average magnitude value of a bin i can be expressed as follows:

$r_4 > n_p$ $n_p * 0.5 < r_3 < (n_p)$ $n_p * 0.25 < r_2 < (n_p * 0.5)$ $0 < r_1 < (n_p * 0.25)$

Further, the mask value assigned for each range can be as follows $r_4$ mask value=0

$r_3$ mask value=1

$r_2$ mask value=2

$r_1$ mask value=3

A mask value is assigned to each bin i by determining whether the average magnitude value for bin i falls into range $r_1$, $r_2$, $r_3$ or $r_4$. The mask values are arbitrary values which are used to specify a predetermined adjustment factor which is to be applied to a particular instantaneous magnitude value of a particular bin i. For example, mask value 0 can specify that the instantaneous magnitude value of bin i should be set to zero. Mask value 1 can specify that the instantaneous magnitude value of bin i should be multiplied by 0.25. Mask value 2 can specify that the instantaneous magnitude value of bin i should be multiplied by 0.5. Mask value 3 can specify that the instantaneous magnitude value of bin i should be passed with no change. Note that the choices of 0.25 and 0.5 were chosen since these can be easily implemented in a FPGA (as is known in the art).

After all the mask values are computed in 218, the mask is used at 206 to adjust the instantaneous bin magnitudes for each bin. This is essentially a notching operation in which the interfering signal is excised or notched out of the signal. After the frequency bins for a particular block of frequency domain data are notched in 206, the block is passed to IFFT processor 208, where it is converted back to the time domain using conventional means. At processing block 209, after the completion of IFFT, the output time domain data is limited to include only the middle half of the samples of the IFFT (e.g. samples 512-1535 in a scenario where N=2048). There are several reasons why it is advantageous to only output the middle half of the time domain data samples. First, the windowing function has largest values in the middle half of the bins. Also, the non-periodicity of the time-domain samples into the FFT, and the removal of interference in nulling block produce edge-effect discontinuities which can affect the start and end samples. The output sample limiting step is therefore performed in order to provide only the most reliable samples generated by the process. Thereafter, at 210 the resulting time domain data values are multiplied by the inverse of the windowing function used in 202. Finally, since the FFT and IFFT use auto-scaling as noted above, any final scaling needed to compensate for gain of FFT/IFFT and differences caused by auto-scaling from block to block is performed in block 212.

It will be appreciated by those skilled in the art that the inventive arrangements are not limited to utilization of four signal magnitude ranges $r_4$, $r_3$, $r_2$, and $r_1$ as described herein. More or fewer signal magnitude ranges can be used. For example three signal magnitude ranges or five signal magnitude ranges would be acceptable. In such a scenario, more or fewer mask values could be used to specify more or fewer possible adjustments to each instantaneous frequency bin values. Also, in such a scenario, the selected mask values could specify somewhat different adjustments to the instantaneous bin value in block 206. The number of magnitude ranges and corresponding adjustments of the instantaneous value of each frequency bin will be determined by a number of factors. These factors can include the nature of the signal of interest, the characteristics of the expected interfering signals, and the hardware resources available for processing and memory.

Filter 108 can be realized in one computer system or in several interconnected computer systems. Any kind of computer system or other apparatus adapted for carrying out the processing described herein is suited. Suitable hardware can include a microprocessor, digital signal processor (DSP) and/or a general-purpose computer system. A computer program can control the hardware such that it carries out the methods described herein.

Those skilled in the art will appreciate that the system architecture illustrated in FIG. 1 is one possible example of a receiver system. However, the invention is not limited in this regard and any other suitable system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for filtering a time domain data signal, comprising receiving from a radio receiving device a digital baseband signal data;

using at least one electronic circuit in a filter device to
double a sample size of the digital baseband signal data by forming an enhanced data set, the enhanced data set obtained by combining samples from a current block of time domain data with an immediately preceding block of time domain data;
apply a windowing function to the enhanced data set;
perform a Fast Fourier Transform (FFT) operation using the enhanced data set which has been windowed to obtain a plurality FFT samples, each FFT sample comprised of instantaneous frequency bin values which include a real in-phase part and an imaginary quadrature part;
calculate an instantaneous magnitude value and an average magnitude value for each frequency bin based on the plurality of instantaneous frequency bin values;
calculate a noise floor based on the average magnitude values of a plurality of the frequency bins;
using the noise floor to identify at least one frequency bin which contains spectral energy associated with an interfering signal;
selectively reduce the instantaneous frequency bin values of the at least one frequency bin that contains the spectral energy associated with the interfering signal;
after said reducing, perform an inverse FFT operation based on the instantaneous frequency bin values to calculate a notched time domain digital data set in which spectral components of the interfering signal have been reduced;
apply an inverse of the windowing function to the notched time domain digital data set.

2. The method according to claim 1, wherein the instantaneous magnitude values and average magnitude values exclusively comprise frequency bin amplitude levels rather than frequency bin power levels.

3. The method according to claim 1, further comprising calculating the instantaneous magnitude value for each of the frequency bins using a magnitude estimating algorithm that is computationally less intensive as compared to an actual magnitude calculation in which an exact value of instantaneous magnitude is calculated.

4. The method according to claim 3, wherein the magnitude estimating algorithm calculates an estimated magnitude value, instantaneous mag_bin(i), for each said frequency bin using the equation:

$$\text{instantaneous\_mag\_bin}(i) = (\max(\text{abs}(\text{real}), \text{abs}(\text{imag})) + (\min(\text{abs}(\text{real}), \text{abs}(\text{imag})) * 0.5),$$

where max(abs(real), abs(imag) is the larger value selected as between the absolute value of the real in-phase part and the absolute value of the imaginary quadrature part of each FFT sample, and min(abs(real),abs(imag) is the smaller value selected as between the absolute value of the real in-phase part and the absolute value of the imaginary quadrature part of each FFT sample.

5. The method according to claim 1, wherein the average magnitude value is calculated by using an averaging filter which calculates an estimated average magnitude for each frequency bin using a computationally less intensive method as compared to an actual averaging calculation in which a true average value is obtained.

6. The method according to claim 5, wherein the estimated average magnitude for each frequency bin is calculated using the equation $$\text{average\_mag\_bin}(i) = (\text{average\_mag\_bin}(i) * (1-\alpha) + (\text{instantaneous mag\_bin}(i) * \alpha))),$$

where:

average_mag_bin(i) is the current estimated average frequency bin value for bin i, instantaneous mag_bin(i) is the scaled instantaneous magnitude value of bin (i), and $\alpha$ is a weighting factor.

7. The method according to claim 1, further comprising converting each average magnitude value to log scale to obtain a plurality of log scale average magnitude values, and using the plurality of log scale average magnitude values to calculate the noise floor.

8. The method according to claim 1, wherein the noise floor is calculated by determining a subset of frequency bins representative of the received signal and noise and approximating their average value.

9. The method according to claim 1, wherein the identifying of said at least one frequency bin which contains spectral energy associated with said interfering signal comprises identifying those frequency bins in which the average magnitude value calculated for the frequency bin exceeds the noise floor by a predetermined amount.

10. The method according to claim 9, wherein the selectively reducing comprises:

determining one of a plurality of signal magnitude ranges for each said frequency bin having an average magnitude value exceeding the noise floor by the predetermined amount; and based on the signal magnitude range determined for each said frequency bin, automatically choosing for that bin an adjustment factor to be applied to selectively reduce the real in-phase part and the imaginary quadrature part.

11. The method according to 1, further comprising limiting an output sample set produced by the inverse FFT operation so that the output time domain data is limited to include only the middle half of the output samples.

12. A radio receiving apparatus, comprising a radio receiver circuit which converts radio frequency signals to digital baseband signal data;

a filter device which receives the digital baseband signal data and includes at least one processing circuit which doubles a sample size of the digital baseband signal data by forming an enhanced data set, the enhanced data set obtained by combining samples from a current block of time domain data with an immediately preceding block of time domain data;

applies a windowing function to the enhanced data set;

performs a Fast Fourier Transform (FFT) operation using the enhanced data set which has been windowed to obtain a plurality FFT samples, each FFT sample comprised of instantaneous frequency bin values which include a real in-phase part and an imaginary quadrature part;

calculates an instantaneous magnitude value and an average magnitude value for each frequency bin based on the plurality of instantaneous frequency bin values;

calculates a noise floor based on the average magnitude values of a plurality of the frequency bins;

uses the noise floor to identify at least one frequency bin which contains spectral energy associated with an interfering signal;

selectively reduces the instantaneous frequency bin values of the at least one frequency bin that contains the spectral energy associated with the interfering signal;

after said reducing, performs an inverse FFT operation based on the instantaneous frequency bin values to calculate a notched time domain digital data set in which spectral components of the interfering signal have been reduced; and applies an inverse of the windowing function to the notched time domain digital data set.

13. The radio receiving apparatus according to claim 12, wherein the instantaneous magnitude values and average magnitude values exclusively comprise frequency bin amplitude levels rather than frequency bin power levels.

14. The radio receiving apparatus according to claim 12, wherein the at least one processing circuit further calculates the instantaneous magnitude value for each of the frequency bins using a magnitude estimating algorithm that is computationally less intensive as compared to an actual magnitude calculation in which an exact value of instantaneous magnitude is calculated.

15. The radio receiving apparatus according to claim 14, wherein the magnitude estimating algorithm calculates an estimated magnitude value, instantaneous mag_bin(i), for each said frequency bin using the equation:

$$\text{instantaneous\_mag\_bin}(i) = (\max(\text{abs}(\text{real}), \text{abs}(\text{imag})) + (\min(\text{abs}(\text{real}), \text{abs}(\text{imag})) * 0.5),$$

where max(abs(real), abs(imag) is the larger value selected as between the absolute value of the real in-phase part and the absolute value of the imaginary quadrature part of each FFT sample, and min(abs(real),abs(imag) is the smaller value selected as between the absolute value of the real in-phase part and the absolute value of the imaginary quadrature part of each FFT sample.

16. The radio receiving apparatus according to claim 12, wherein the at least one processing circuit calculates the average magnitude value by using an averaging filter which calculates an estimated average magnitude for each frequency bin using a computationally less intensive method as compared to an actual averaging calculation in which a true average value is obtained.

17. The radio receiving apparatus according to claim 16, wherein the estimated average magnitude for each frequency bin is calculated using the equation $$\text{average\_mag\_bin}(i) = (\text{average\_mag\_bin}(i) * (1-\alpha) + (\text{instantaneous mag\_bin}(i) * \alpha))),$$

where:
average_mag_bin(i) is the current estimated average frequency bin value for bin i,
instantaneous mag_bin(i) is the scaled instantaneous magnitude value of bin (i), and
$\alpha$ is a weighting factor.

18. The radio receiving apparatus according to claim 12, wherein the at least one processing circuit converts each average magnitude value to log scale to obtain a plurality of log scale average magnitude values, and uses the plurality of log scale average magnitude values to calculate the noise floor.

19. The radio receiving apparatus according to claim 12, wherein the at least one processing circuit calculates the noise floor by determining a subset of frequency bins representative of the received signal and noise and approximating their average value.

20. The radio receiving apparatus according to claim 12, wherein the at least one processing circuit identifies said at least one frequency bin which contains spectral energy associated with said interfering signal by identifying those frequency bins in which the average magnitude value calculated for the frequency bin exceeds the noise floor by a predetermined amount.

21. The radio receiving apparatus according to claim 20, wherein at least one processing circuit selectively reduces the instantaneous frequency bin values of the at least one frequency bin that contains the spectral energy associated with the interfering signal by:
determining one of a plurality of signal magnitude ranges for each said frequency bin having an average magnitude value exceeding the noise floor by the predetermined amount; and
based on the signal magnitude range determined for each said frequency bin, automatically choosing for that bin an adjustment factor to be applied to selectively reduce the real in-phase part and the imaginary quadrature part.

22. The radio receiving apparatus according to 12, wherein the at least one processing circuit limits an output sample set produced by the inverse FFT operation so that the output time domain data is limited to include only the middle half of the output samples.

23. A filter device for adaptive interference mitigation in a wideband communication systems, comprising
a digital signal processor device which includes at least one processing circuit arranged to
receive a digital baseband signal data;
double a sample size of the digital baseband signal data by forming an enhanced data set, the enhanced data set obtained by combining samples from a current block of time domain data with an immediately preceding block of time domain data;
apply a windowing function to the enhanced data set;
perform a Fast Fourier Transform (FFT) operation using the enhanced data set which has been windowed to obtain a plurality FFT samples, each FFT sample comprised of instantaneous frequency bin values which include a real in-phase part and an imaginary quadrature part;
calculate an instantaneous magnitude value and an average magnitude value for each frequency bin based on the plurality of instantaneous frequency bin values;
calculate a noise floor based on the average magnitude values of a plurality of the frequency bins;
use the noise floor to identify at least one frequency bin which contains spectral energy associated with an interfering signal;
selectively reduce the instantaneous frequency bin values of the at least one frequency bin that contains the spectral energy associated with the interfering signal;
after said reducing, perform an inverse FFT operation based on the instantaneous frequency bin values to calculate a notched time domain digital data set in which spectral components of the interfering signal have been reduced; and
apply an inverse of the windowing function to the notched time domain digital data set.

\* \* \* \* \*